(12) United States Patent
Alldredge et al.

(10) Patent No.: US 9,738,333 B2
(45) Date of Patent: Aug. 22, 2017

(54) FIFTH WHEEL LOCKING MECHANISM

(71) Applicant: Fontaine Fifth Wheel Company, Trussville, AL (US)

(72) Inventors: Steven Alldredge, Cullman, AL (US); Timothy Johnson, Freeport, ME (US)

(73) Assignee: Fontaine Fifth Wheel Company, Trussville, AL (US)

( * ) Notice: Subject to any disclaimer, the term of this patent is extended or adjusted under 35 U.S.C. 154(b) by 174 days.

(21) Appl. No.: 14/617,392

(22) Filed: Feb. 9, 2015

(65) Prior Publication Data
US 2015/0225028 A1     Aug. 13, 2015

Related U.S. Application Data

(60) Provisional application No. 61/937,246, filed on Feb. 7, 2014.

(51) Int. Cl.
*B62D 53/08* (2006.01)
*B62D 53/12* (2006.01)
*B62D 53/10* (2006.01)

(52) U.S. Cl.
CPC ......... *B62D 53/12* (2013.01); *B62D 53/0885* (2013.01); *B62D 53/10* (2013.01)

(58) Field of Classification Search
CPC ..... B62D 53/12; B62D 53/10; B62D 53/0885
See application file for complete search history.

(56) References Cited

U.S. PATENT DOCUMENTS

| | | | |
|---|---|---|---|
| 2,772,895 A | 12/1956 | Steeves et al. | |
| 2,885,222 A * | 5/1959 | Walther, Sr. | B62D 53/0885 280/434 |
| 3,442,533 A | 5/1969 | Walther | |
| 3,632,145 A | 1/1972 | Davis et al. | |
| 3,787,076 A | 1/1974 | Walther et al. | |

(Continued)

FOREIGN PATENT DOCUMENTS

| | | |
|---|---|---|
| GB | 864191 | 3/1961 |
| WO | WO 2005/016726 | 2/2005 |

OTHER PUBLICATIONS

Fifth Wheels Catalog & Selection Guide, XL-FW447-01 Rev B, Jan. 2006, Holland Group Inc., 58 pages.

(Continued)

*Primary Examiner* — Anne Marie M Boehler
*Assistant Examiner* — Gabriela C Craciun
(74) *Attorney, Agent, or Firm* — Andrus Intellectual Property Law LLP (57) ABSTRACT

A fifth wheel includes a top plate having a throat that is adapted to receive a kingpin of a trailer. A pair of locking jaws are pivotally connected to the top plate and pivotal between a closed configuration where the pair of locking jaws block passage of a kingpin out of the throat and the locking jaws are held primarily in compression and an open configuration where a kingpin may pass into and out of the throat. Each of the pair of locking jaws has an engagement surface adapted to engage a kingpin positioned in the throat when the pair of locking jaws are in the closed configuration. A locking member is movably attached to the top plate and a mechanism urges the locking member into engagement with the pair of locking jaws when the pair of locking jaws are in the closed configuration.

24 Claims, 5 Drawing Sheets

(56) References Cited

U.S. PATENT DOCUMENTS

| | | | |
|---|---|---|---|
| 4,008,904 A | 2/1977 | Davies | |
| 4,106,793 A | 8/1978 | Neff | |
| 4,208,062 A | 6/1980 | Maassen | |
| 4,333,666 A | 6/1982 | Hammonds | |
| 4,428,595 A | 1/1984 | Martin et al. | |
| 4,592,566 A | 6/1986 | Inoue et al. | |
| 5,263,856 A * | 11/1993 | Huehn | B62D 53/0885 280/433 |
| 5,472,223 A | 12/1995 | Hawthorne et al. | |
| 5,516,138 A | 5/1996 | Fontaine | |
| 5,865,458 A | 2/1999 | Golembiewski et al. | |
| 6,092,825 A | 7/2000 | Flater | |
| 6,095,544 A | 8/2000 | Flater | |
| 6,272,949 B1 | 8/2001 | Jarvis et al. | |
| 6,352,277 B1 | 3/2002 | Timmings | |
| 6,520,527 B2 | 2/2003 | Laarman | |
| 7,036,839 B2 * | 5/2006 | Hungerink | F16N 15/02 280/433 |
| 7,152,869 B2 | 12/2006 | Dupay et al. | |
| 7,384,056 B2 | 6/2008 | Anderson | |
| 7,735,849 B1 | 6/2010 | Mann | |
| 8,132,825 B1 | 3/2012 | Choquette et al. | |
| 9,327,782 B2 * | 5/2016 | Alldredge | B62D 53/0885 |
| 2004/0145150 A1 * | 7/2004 | Yeakel | B62D 53/12 280/433 |
| 2007/0209879 A1 * | 9/2007 | Schmidt | B62D 53/0885 184/6.19 |
| 2008/0067781 A1 * | 3/2008 | Shirk | B62D 53/0857 280/433 |
| 2011/0025019 A1 * | 2/2011 | Schmidt | B62D 29/002 280/504 |
| 2012/0018977 A1 * | 1/2012 | Stanifer | B62D 53/0885 280/433 |
| 2013/0228999 A1 * | 9/2013 | Keatley | B60D 1/015 280/438.1 |
| 2014/0138933 A1 * | 5/2014 | Diller | B62D 53/10 280/433 |
| 2015/0158355 A1 * | 6/2015 | Alldredge | B62D 53/12 280/434 |

OTHER PUBLICATIONS

"Reese 5th Wheel Trailer Hitch w/ Roud Tube Slider—Dual Jaw -16,000 lbs Reese Fifth Wheel RP30075" http://www.etrailer.com/Fifth-Wheel/Reese/RP30075.html, Aug. 1, 2013.

Catalog & Specification Guide, Holland Fifth Wheels, XL-FW10066SG-en-US Rev E, Jun. 2013, SAF-Holland, Inc., 100 pages.

* cited by examiner

FIFTH WHEEL LOCKING MECHANISM

CROSS REFERENCE TO RELATED APPLICATIONS

This application claims priority to U.S. Provisional Patent Application No. 61/937,246, filed Feb. 7, 2014, the entire contents of which are hereby incorporated by reference.

FIELD OF THE INVENTION

The present invention relates generally to fifth wheels of the type used by tractor trucks to pull trailers and the like and, in particular, to a fifth wheel locking mechanism.

BACKGROUND

Towing vehicles, such as tractor trucks or semi-tractors and the like, are equipped with fifth wheel hitches which receive and engage the kingpins of trailers. The fifth wheel is positioned on the back of the tractor truck and features a top plate having a central throat equipped with a latching mechanism which engages the kingpin. The throat may be, for example, provided with an open end facing the rear of the truck. The kingpin extends downward from the underside of the leading end portion of the trailer. The engagement of the trailer kingpin by the fifth wheel is the primary means by which the trailer is pivotally connected to the tractor.

A need exists for fifth wheel locking mechanisms for tractor trucks or semi-tractors, and similar applications, that are very robust, reliable and quick and easy to hitch and unhitch. It is also desirable for such fifth wheels to prevent, or at least minimize, false locking cases.

DETAILED DESCRIPTION OF EMBODIMENTS

An embodiment of the fifth wheel of the present invention is indicated in general at 10 in FIGS. 1A-1C and 2. The locking mechanism of the fifth wheel is shown in a "closed" or "locked" configuration in FIG. 1A, that is, a configuration where the kingpin of a trailer (not shown in FIG. 1A) would be positioned within the throat 24 of the fifth wheel so that the trailer may be towed by the towing vehicle upon which the fifth wheel 10 is positioned.

Figure 1A:
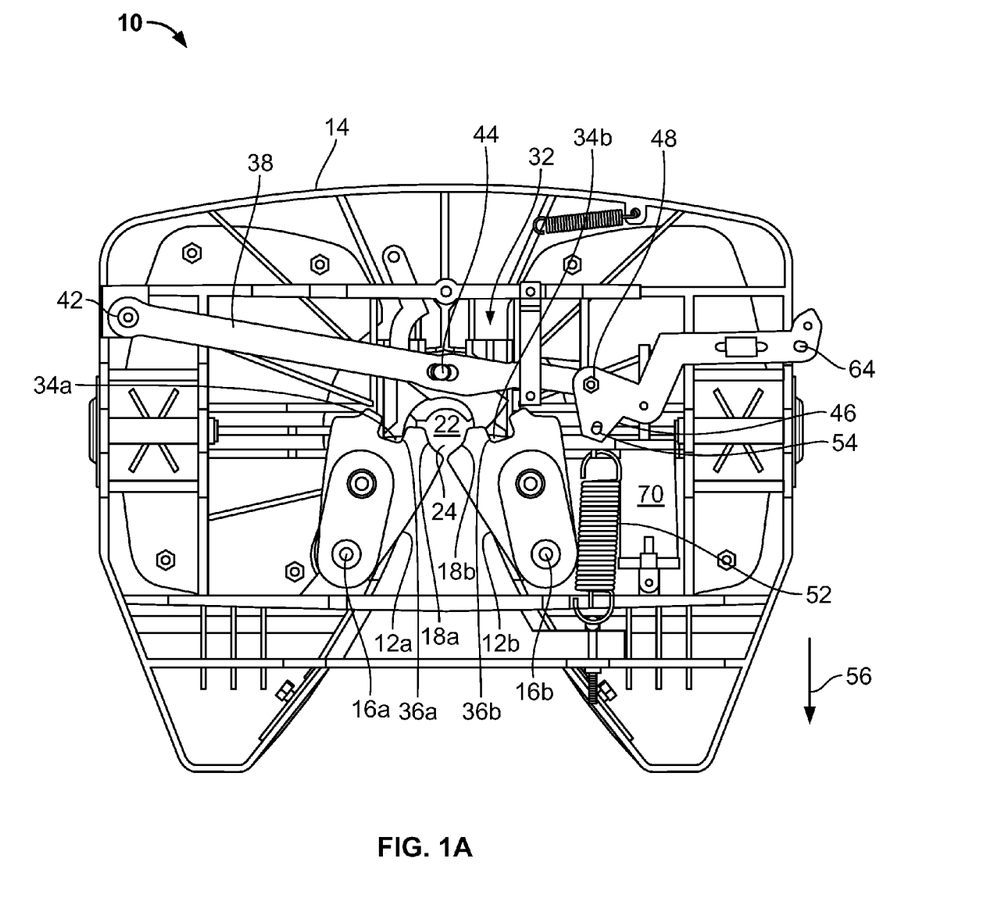
FIG. 1A is a bottom plan view of an embodiment of the fifth wheel of the present invention with the locking mechanism in a locked configuration.

As illustrated in FIG. 1A, the locking mechanism includes a pair of locking jaws 12a and 12b pivotally attached at their proximal ends to the fifth wheel top plate 14 via hinge pins 16a and 16b. The distal ends of the locking jaws 12a and 12b are provided with curved kingpin engagement surfaces 18a and 18b. In addition, the mechanism is provided with a stationary front jaw 22 which has a curved surface that cooperates with the curved kingpin engagement surfaces 18a and 18b to define a throat 24 within which the kingpin of a trailer is locked. Kingpin towing forces (forces in the direction of the locking jaws 12a and 12b) are transmitted directly onto the curved surfaces 18a and 18b of the jaws. These forces are distributed throughout the lengths of the jaws 12a and 12b and are transmitted into the top plate 14 at the hinge point/hinge pins 16a and 16b.

Standard loading will prevent the jaws 12a and 12b from opening from the locked positions illustrated in FIG. 1A due to the shape of the interface between the kingpin and the jaws, that is, the curved kingpin engagement surfaces 18a and 18b. Additional locking is provided, however, by a generally U-shaped locking member, indicated in general at 32 in FIGS. 1A and 3. More specifically, the locking member includes a pair of leg portions 34a and 34b that engage recesses 36a and 36b formed in the distal ends of the locking jaws 12a and 12b when the jaws are in the closed configuration illustrated in FIGS. 1A and 3. This prevents the jaws from retracting due to friction during turning or other potential jarring or impact forces.

Figure 1B:
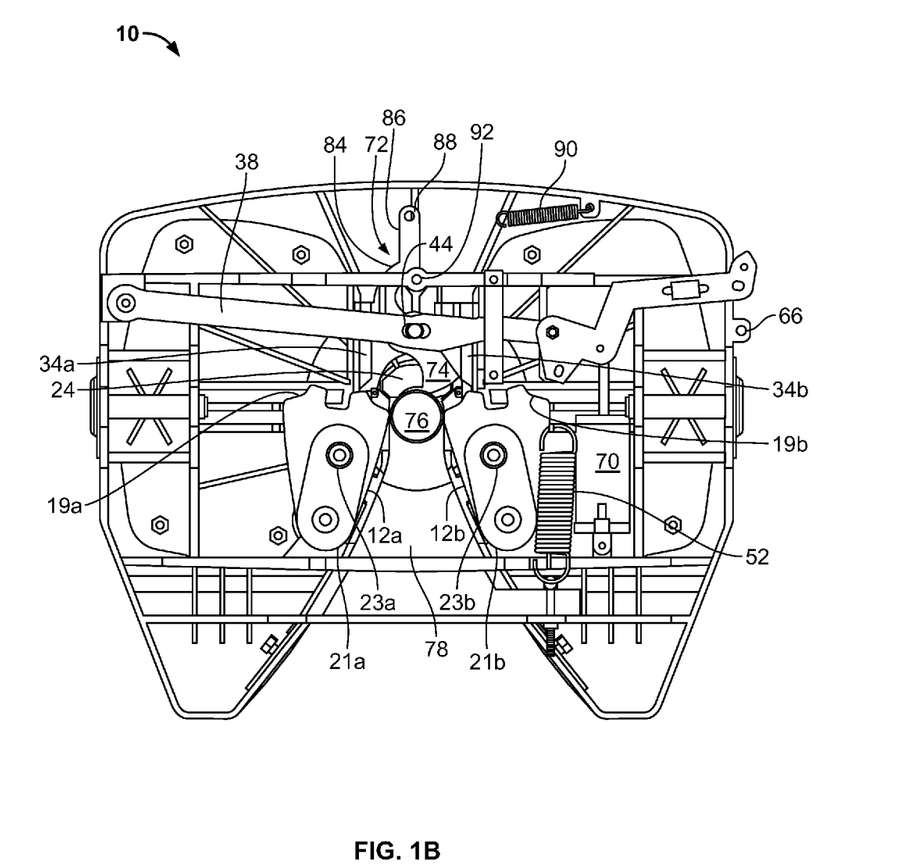
FIG. 1B is a bottom plan view of the fifth wheel of FIG. 1A with the locking mechanism in an armed configuration with a kingpin being received.
Figure 3:
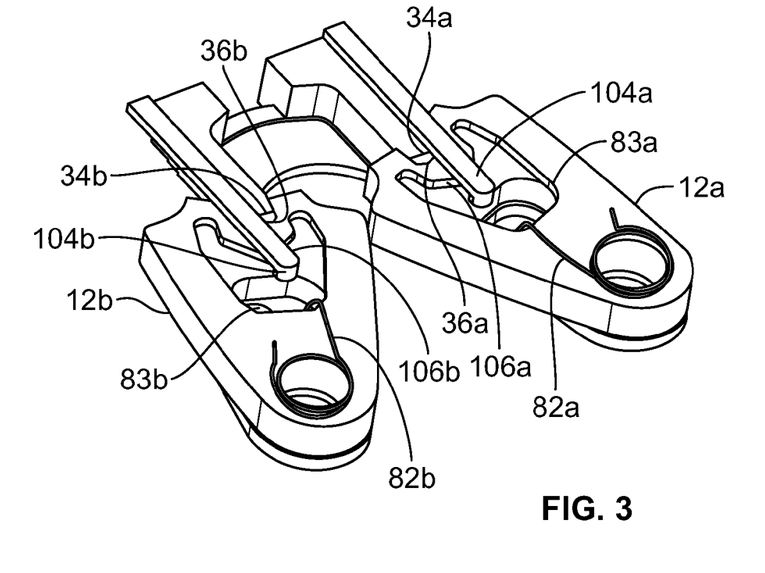
FIG. 3 is a top perspective view of the locking jaws and locking member of the locking mechanism of the fifth wheel in the configuration of FIGS. 1A and 2.

As illustrated in FIGS. 1B and 3, locking jaws 12a and 12b are symmetrical and include secondary kingpin engagement surfaces 19a and 19b. Each locking jaw therefore may be flipped over or the positions of locking jaws 12a and 12b reversed, that is, locking jaw 12a could be used in the position illustrated for locking jaw 12b and vice versa. As a result, when kingpin engagement surfaces 18a and 18b are worn out, the locking jaws 12a and 12b may be flipped over or swapped so that new/secondary kingpin engagement surfaces 19a and 19b are put into use.

Furthermore, as illustrated in FIG. 1B, the undersides of the locking jaws are covered by bottom plates 21a and 21b, which are secured to the top plate by hinge pins 16a and 16b and by bolts 23a and 23b. The bottom plates protect the locking jaws from debris and also permit them to be removed and flipped over, swapped or replaced, while the fifth wheel is still mounted on the vehicle. Indeed, all of the parts of the locking mechanism are replaceable and may be accessed while the fifth wheel remains mounted on the vehicle.

Figure 2:
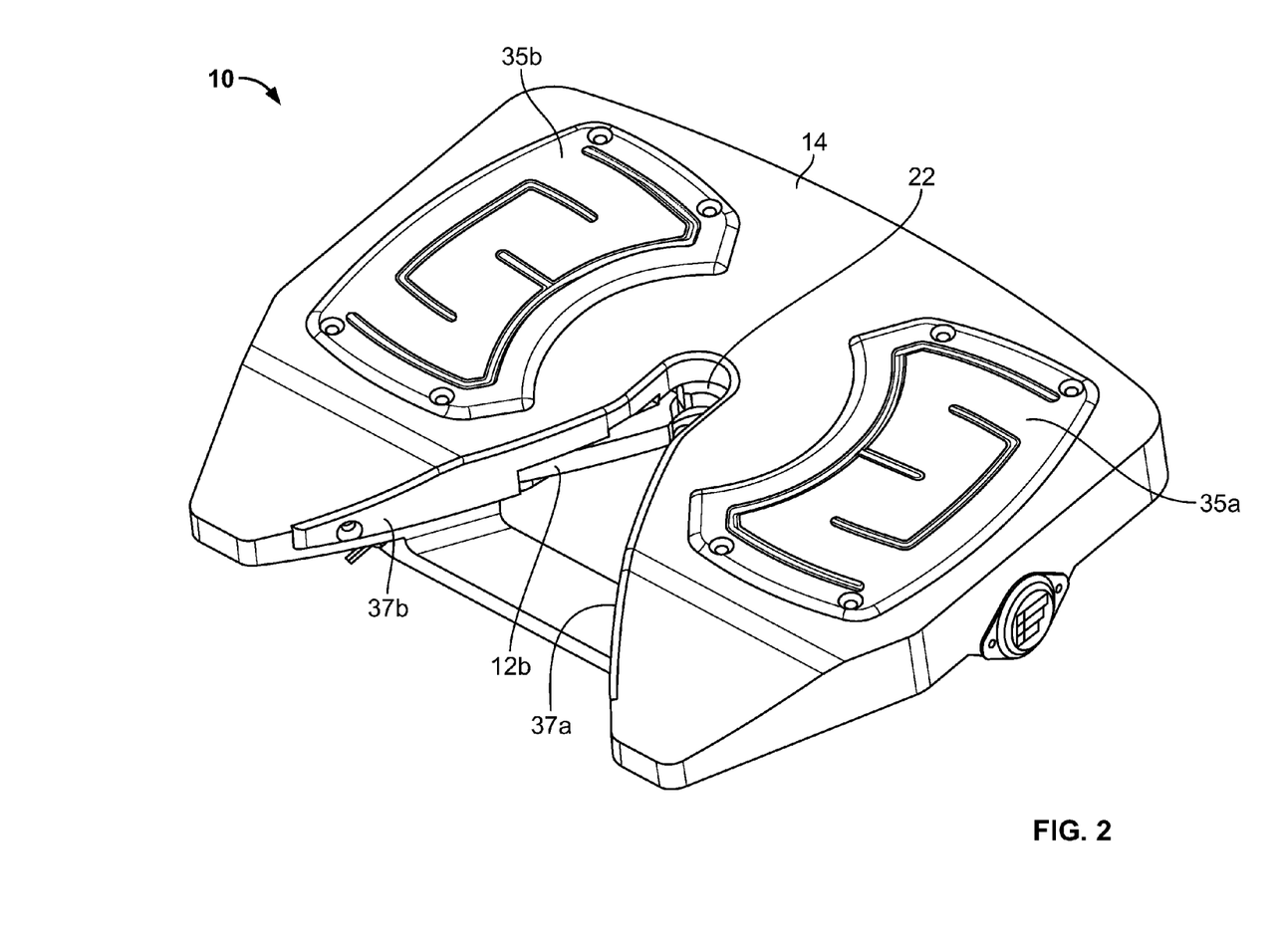
FIG. 2 is a top perspective view of the fifth wheel of FIG. 1A.

With reference to FIG. 2, the top plate 14 is provided with removable top wear pads 35a and 35b that cover corresponding openings in the top plate. As an example only, the wear pads 35a and 35b may be secured to the top plate with bolts or screws. As a result, the top wear pads may be removed so that the components of the fifth wheel locking mechanism under the top plate may be accessed for repair or replacement while the fifth wheel is still mounted on the vehicle. In addition, the top wear pads may be easily replaced when they become worn, as may the removable fifth wheel mouth wear pads 37a and 37b (also illustrated in FIG. 2).

Figure 1C:
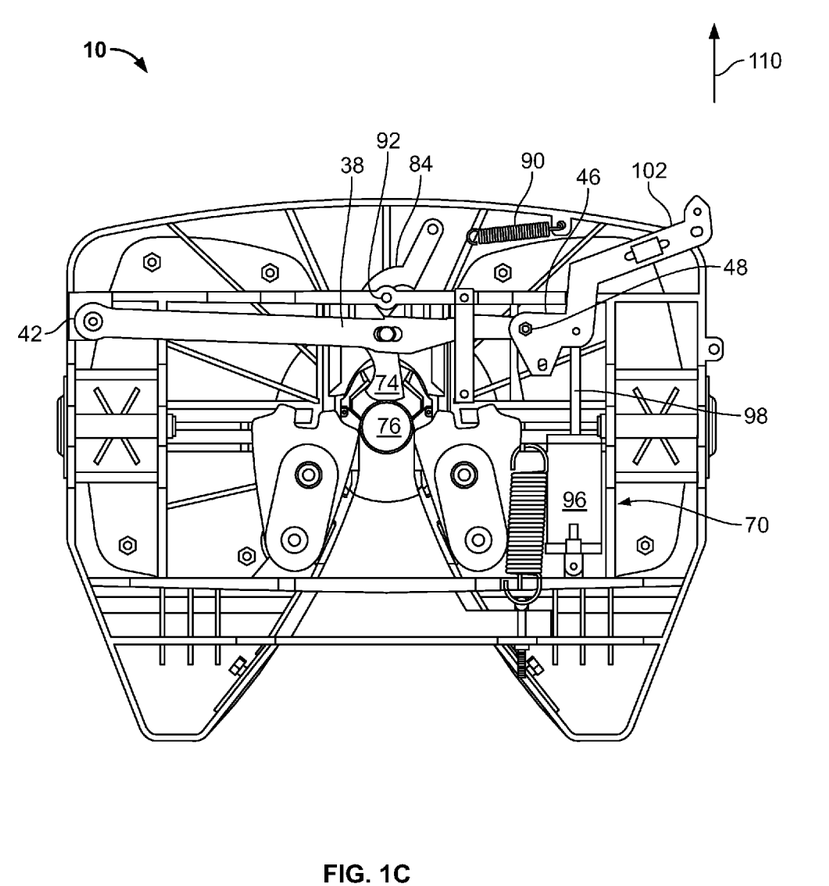
FIG. 1C is a bottom plan view of the fifth wheel of FIGS. 1A and 1B with the locking mechanism in a reset configuration prior to a kingpin being received.

With reference to FIGS. 1A-1C, the locking member 32 is held in place by a release arm 38 which is pivotally mounted to the top plate by a first end via bolt 42. More specifically, the release arm is pivotally attached to the locking member 32 via pin 44. A secondary locking pawl 46 is pivotally attached to a second end of the release arm 38 by bolt 48.

A tension locking spring 52 features a first end that is attached to the fifth wheel top plate 14 and a second end that is attached to the secondary locking pawl 46 via opening 54 (the spring is shown disconnected from the secondary locking pawl opening 54 in FIGS. 1A-1C for ease of viewing). As a result, the locking spring pulls secondary locking pawl 46 in the direction of arrow 56 of FIG. 1A so that the release arm 38 pivots in a clockwise direction (about bolt 42) and urges the leg portions 34a and 34b of the locking member 32 into engagement with the recesses 36a and 36b of the locking jaws 12a and 12b, as illustrated in FIGS. 1A and 3.

Figure 4:
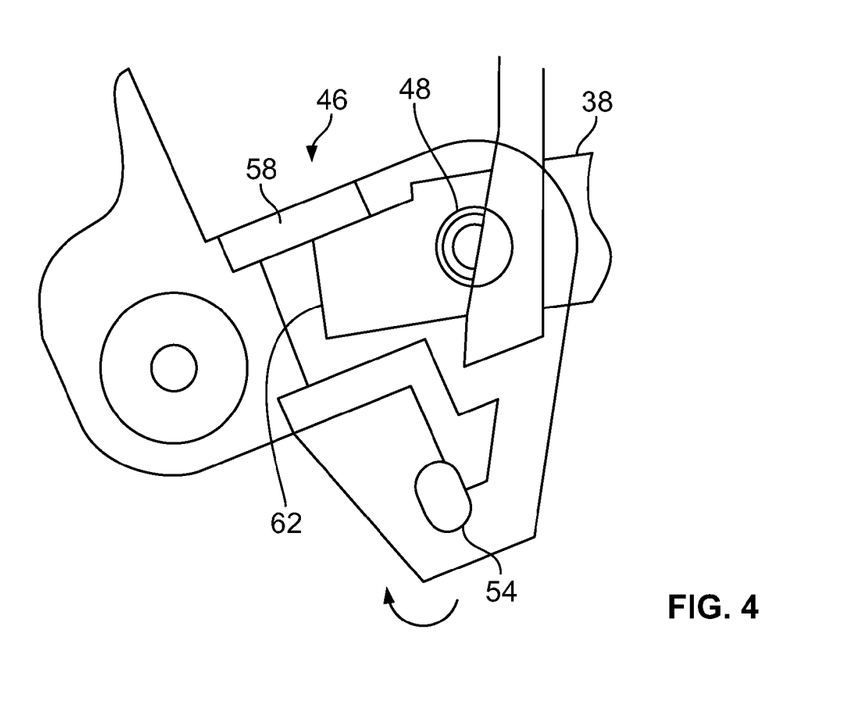
FIG. 4 is an enlarged plan view of the side of the secondary locking pawl of the locking mechanism that faces the fifth wheel top plate in the fifth wheel of FIGS. 1A-3 with the locking mechanism in the configuration of FIGS. 1A and 2.

With reference to FIG. 4, a pawl projection 58 projects from the underside of the secondary locking pawl 46 (i.e. the side of the secondary locking pawl not visible in FIG. 1A) towards the top plate 14. A locking tab 62 is formed on the end of the release arm 38 that is pivotally connected to bolt 48. As illustrated in FIG. 4, the locking tab 62 of the release arm engages the pawl projection 58 of the secondary locking pawl 46 when the locking mechanism of the fifth wheel is in the closed configuration illustrated in FIG. 1A. This retains the release arm 38 in the position illustrated in FIG. 1A to prevent disengagement of the locking member 32 from the locking jaws 12a and 12b during transit due to jarring and impact.

As illustrated in FIG. 1C, the secondary locking pawl 46 is provided with a release handle 102. As will be described in greater detail below, the release handle 102 may be actuated so as to cause the secondary locking pawl to rotate counterclockwise about bolt 48 to unlock the fifth wheel locking mechanism.

An additional tertiary lock is available by way of manually inserting a locking pin 64 (FIG. 1A) into a hole 66 (FIG. 1B) in the top plate and an aligned hole in the secondary locking pawl release handle in order to create a positive lock between the two. Engaging this tertiary lock will prevent the mechanism from opening while in transit, even in the event that the pneumatic release cylinder 70, discussed below, is activated.

Insertion of a trailer kingpin into the fifth wheel 10 is shown in FIG. 1B. A kingpin 76 enters the throat 24 of the fifth wheel through the mouth 78. As the kingpin enters the fifth wheel, it contacts the two locking jaws 12a and 12b separating them to allow for its entrance into the throat. With reference to FIG. 3, the locking jaws are provided with torsion springs 82a and 82b that surround and are secured in place by hinge pins 16a and 16b (FIG. 1A). Torsion spring 82a engages the top plate 14 and a recess 83a formed in locking jaw 12a while torsion spring 82b engages the top plate 14 and a recess 83b formed in locking jaw 12b. The torsion springs 82a and 82b urge the locking jaws into the positions illustrated in FIGS. 1A, 2 and 3. As a result, as the kingpin enters the home position or locked position in the center of the fifth wheel throat 24, the two jaws 12a and 12b snap closed behind it into the positions illustrated in FIGS. 1A, 2 and 3 locking it into place.

A trigger, indicated in general at 72, features a bumper portion 74 that is initially positioned within the throat 24 of the fifth wheel. The trigger 72 is rotatably mounted to the locking member and the release arm 38 by pin 44. The trigger also features a hook portion 84 and a spring tab 86 having an opening 88. A trigger tension spring 90 features a first end attached to the fifth wheel top plate and a second end attached to the opening 88 of the trigger spring tab (shown disconnected in FIGS. 1A-1C for ease of viewing). Prior to the kingpin 76 contacting the bumper portion 74 of the trigger 72, the hook portion 84 of the trigger engages a top plate retaining pin 92 so that the bumper portion is positioned within the throat 24.

As the kingpin 76 contacts the bumper portion 74 of the trigger 72, as illustrated in FIG. 1B, it causes the trigger to rotate in the counter-clockwise direction about pin 44, against the urging of trigger spring 90, disengaging the hook portion 84 of the trigger from the retaining pin 92 in the top plate. As a result, the locking spring 52 is permitted to pull the release arm 38, trigger 72, and lock 32, toward the kingpin (i.e. toward the trailing end of the fifth wheel), engaging the lock, and subsequently, the secondary lock (as illustrated in FIGS. 1A, 2 and 4).

With reference to FIG. 1C, when it is desired to unhitch the kingpin 76 from the fifth wheel 10, the locking mechanism is reset by activation of a pneumatic release cylinder, indicated in general at 70. More specifically, the pneumatic release cylinder features a housing portion 96 attached to the fifth wheel top plate and a rod 98 with an end pivotally attached to the secondary locking pawl 46. The pneumatic release cylinder is activated by the operator of the vehicle upon which the fifth wheel is mounted (such as by pressing a button in the vehicle cab). When the pneumatic cylinder is activated, the rod 98 extends out of the housing 96 so that the secondary locking pawl 46 rotates counter-clockwise about bolt 48. As a result, with reference to FIG. 4, pawl projection 58 is rotated clear of tab 62 and the secondary lock is disengaged or released.

Having disengaged the secondary lock, the release arm 38 is rotated up or counter-clockwise around bolt 42 via further extension of rod 98 of the pneumatic release cylinder. As a result, the locking member 32 is moved away from the throat of the fifth wheel (i.e. towards the leading end of the fifth wheel) and the pair of leg portions 34a and 34b of the locking member disengage the recesses 36a and 36b of the distal ends of the locking jaws 12a and 12b so that they are free to rotate about hinge pins 16a and 16b. With reference to FIG. 3, the locking member 32 also includes timing cam arms 104a and 104b which travel along cam surfaces 106a and 106b of the locking jaws 12a and 12b so as to open the two jaws (i.e. into the positions shown in FIG. 1C) during actuation of the pneumatic release cylinder and the corresponding movement of release arm 38 and locking member 32.

In addition, as the release arm 38 rotates counter-clockwise about bolt 42, the trigger 72, under the urging of trigger spring 90, is rotated clockwise about pin 44 and reset so that the hook portion 84 of the trigger engages retaining pin 92. As a result, and as illustrated in FIG. 1C, after activation (and then deactivation) of pneumatic release cylinder 70, the bumper portion 74 of the trigger rests against the head of the kingpin 76 and holds the locking jaws 12a and 12b of the locking mechanism open until the kingpin is removed from the fifth wheel.

After the kingpin is removed, the hook portion 84 of the trigger comes to rest again on the retaining pin 92, the release arm 38 returns to the loaded position with the bumper portion 74 of the trigger positioned in the throat 24 of the fifth wheel and the locking jaws 12a and 12b close once again due to, with reference to FIG. 3, the urging of torsion springs 82a and 82b and profiles of locking jaw cam surfaces 106a and 106b.

As an alternative to the use of a pneumatic release cylinder 70, and in the event of a failure of the cylinder, there is the option of manually releasing the secondary lock and opening the mechanism via release handle 102. Pulling the release handle in the direction indicated by arrow 110 of FIG. 1C disengages the secondary locking pawl 46 and rotates the release arm counter-clockwise about bolt 42, as described above, allowing the locking mechanism to fully open, and remain open.

In view of the above, the fifth wheel of FIGS. 1A-4 utilizes a dual-jaw design which enables the load path in a towing loading case to be transmitted primarily through compression as opposed to tension or cantilevering. The two symmetric locking jaws 12*a* and 12*b* are spring loaded in the closed position forming an orifice or throat 24 for retaining the neck of the standard trailer kingpin. These two jaws in conjunction with the stationary front jaw hold the kingpin in place during transit.

While the preferred embodiments of the invention have been shown and described, it will be apparent to those skilled in the art that changes and modifications may be made therein without departing from the spirit of the invention, the scope of which is defined by the following claims.

What is claimed is:

1. A fifth wheel comprising:
   a top plate having a throat that is adapted to receive a trailer kingpin;
   a stationary front jaw having a curved surface;
   a pair of locking jaws pivotally connected to the top plate and pivotal between a closed configuration where the pair of locking jaws block passage of the kingpin out of the throat and are held primarily in compression and an open configuration where a kingpin may pass into and out of the throat, each of said pair of locking jaws having an engagement surface adapted to cooperate with the curved surface of the stationary front jaw to engage the kingpin positioned in the throat when the pair of locking jaws are in the closed configuration;
   a locking member movably attached to the top plate; and
   a mechanism urging the locking member into engagement with the pair of locking jaws when the pair of locking jaws are in the closed configuration.

2. The fifth wheel of claim 1 wherein each of the pair of locking jaws includes a proximal end and a distal end with the engagement surfaces being curved and positioned on the distal ends of the locking jaws and wherein the pair of locking jaws are pivotally attached to the top plate by hinge pins attached to the proximal ends of the pair of locking jaws and the top plate, said hinge pins positioned on the top plate so forces from the kingpin positioned in the throat of the top plate during towing of a corresponding trailer are transmitted onto the curved engagement surfaces of the pair of locking jaws and distributed throughout lengths of the pair of locking jaws so as to be transmitted into the top plate via the hinge pins while the pair of locking jaws are in compression.

3. The fifth wheel of claim 2 wherein the forces from the kingpin during towing retain the pair of locking jaws in the closed configuration.

4. The fifth wheel of claim 1 wherein each of the pair of locking jaws features a secondary kingpin engagement surface and a symmetrical construction so that each of the pair of locking jaws may be flipped over for use or positions of the pair of locking jaws with respect to the top plate may be swapped.

5. The fifth wheel of claim 1 further comprising a pair of removable top wear pads secured to the top plate and overlaying corresponding openings in the top plate to permit access for repair and replacement of components of the fifth wheel while the fifth wheel is mounted on a vehicle.

6. The fifth wheel of claim 1 wherein the mechanism includes a locking spring urging the locking member into engagement with the pair of locking jaws when the pair of locking jaws are in the closed configuration.

7. The fifth wheel of claim 6 wherein the mechanism includes a release arm pivotally attached to the locking member, said release arm having a first end pivotally attached to the top plate and the locking member.

8. The fifth wheel of claim 7 further comprising a retaining pin attached to the top plate and a trigger having a bumper portion and a hook portion, said trigger pivotally attached to the release arm with the bumper portion positioned within the throat when the hook portion is engagement with the retaining pin.

9. The fifth wheel of claim 8 further comprising a trigger spring having a first end attached to the top plate and a second end attached to the trigger so as to urge the hook portion into engagement with the retaining pin.

10. The fifth wheel of claim 7 further comprising a pneumatic cylinder attached between the top plate and a second end of the release arm, said pneumatic cylinder pivoting said release arm in a direction whereby the locking member disengages the pair of locking jaws when activated.

11. The fifth wheel of claim 10 further comprising a secondary locking pawl pivotally attached to the second end of the release arm, said pneumatic cylinder attached to the second end of the release arm via the secondary locking pawl.

12. The fifth wheel of claim 11 further comprising a pawl projection positioned on the secondary locking pawl and a locking tab positioned on the release arm, said release arm engaging the pawl projection when the release arm is in a position where the locking member engages the pair of locking jaws.

13. The fifth wheel of claim 11 further comprising a release handle attached to the secondary locking pawl.

14. A fifth wheel for a connection to trailer kingpin comprising:
   a top plate having a throat that is adapted to receive the kingpin;
   a pair of locking jaws pivotally connected to the top plate and pivotal between a closed configuration where the pair of locking jaws block passage of the kingpin out of the throat and are held primarily in compression and an open configuration where the kingpin may pass into and out of the throat, each of said pair of locking jaws having an engagement surface adapted to engage the kingpin positioned in the throat when the pair of locking jaws are in the closed configuration;
   a locking member movably attached to the top plate;
   a locking spring urging the locking member into engagement with the pair of locking jaws when the pair of locking jaws are in the closed configuration;
   a release member attached to the locking member and the top plate so that when the release member is actuated, the locking member disengages the pair of locking jaws; and
   a retaining pin attached to the top plate and a trigger having a bumper portion and a hook portion, said trigger pivotally attached to the release arm with the bumper portion positioned within the throat when the hook portion is in engagement with the retaining pin.

15. The fifth wheel of claim 14 wherein each of the pair of locking jaws includes a proximal end and a distal end with the engagement surfaces being curved and positioned on the distal ends of the locking jaws and wherein the pair of locking jaws are pivotally attached to the top plate by hinge pins attached to the proximal ends of the pair of locking jaws and the top plate, said hinge pins positioned on the top plate so forces from the kingpin positioned in the throat of the top plate during towing are transmitted onto the curved engagement surfaces of the pair of locking jaws and distributed throughout lengths of the pair of locking jaws so as to be transmitted into the top plate via the hinge pins while the pair of locking jaws are in compression.

16. The fifth wheel of claim 15 wherein the forces from the kingpin during towing retain the pair of locking jaws in the closed configuration.

17. The fifth wheel of claim 14 wherein each of the pair of locking jaws features a secondary kingpin engagement surface and a symmetrical construction so that each of the pair of locking jaws may be flipped over for use or positions of the pair of locking jaws with respect to the top plate may be swapped.

18. The fifth wheel of claim 14 further comprising a pair of removable top wear pads secured to the top plate and overlaying corresponding openings in the top plate to permit access for repair and replacement of components of the fifth wheel while the fifth wheel is mounted on a vehicle.

19. The fifth wheel of claim 14 wherein the release member includes a release arm pivotally attached to the locking member, said release arm having a first end pivotally attached to the top plate and the locking member.

20. The fifth wheel of claim 13 further comprising a trigger spring having a first end attached to the top plate and a second end attached to the trigger so as to urge the hook portion into engagement with the retaining pin.

21. The fifth wheel of claim 19 further comprising a pneumatic cylinder attached between the top plate and a second end of the release arm, said pneumatic cylinder pivoting said release arm in a direction whereby the locking member disengages the pair of locking jaws when activated.

22. The fifth wheel of claim 21 further comprising a secondary locking pawl pivotally attached to the second end of the release arm, said pneumatic cylinder attached to the second end of the release arm via the secondary locking pawl.

23. The fifth wheel of claim 22 further comprising a pawl projection positioned on the secondary locking pawl and a locking tab positioned on the release arm, said release arm engaging the pawl projection when the release arm is in a position where the locking member engages the pair of locking jaws.

24. The fifth wheel of claim 22 further comprising a release handle attached to the secondary locking pawl.

* * * * *